(12) United States Patent
Raynal et al.

(10) Patent No.: US 7,314,602 B2
(45) Date of Patent: Jan. 1, 2008

(54) CONTACT, MIXING, AND QUENCHING BOX FOR FLUIDS, COMPRISING AT LEAST ONE ANNULAR PERIPHERAL OUTLET AND REACTION CELL WITH AN ELONGATED SHAPE ALONG AN AXIS INCLUDING SAID BOX

(75) Inventors: Ludovic Raynal, Oullins (FR); Isabelle Harter, Lyons (FR); Francis Aubry, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 848 days.

(21) Appl. No.: 10/187,432

(22) Filed: Jul. 2, 2002

(65) Prior Publication Data

US 2003/0031612 A1 Feb. 13, 2003

(30) Foreign Application Priority Data

Jul. 2, 2001 (FR) .................................. 01 08788

(51) Int. Cl.
*B01J 8/04* (2006.01)
*B01J 8/02* (2006.01)
*C10G 45/00* (2006.01)

(52) U.S. Cl. ...................... 422/195; 422/194; 422/224; 422/190; 422/191; 208/209; 208/213; 208/254 H; 208/264; 208/143; 208/108

(58) Field of Classification Search ........ 422/188–191, 422/193–195, 207; 208/107, 108, 143, 209, 208/210, 251 H, 254 H; B01J 8/04
See application file for complete search history.

(56) References Cited

U.S. PATENT DOCUMENTS

| | | | | |
|---|---|---|---|---|
| 3,502,445 | A | * | 3/1970 | Ballard et al. .............. 422/191 |
| 4,836,989 | A | * | 6/1989 | Aly et al. .................... 422/195 |
| 5,152,967 | A | * | 10/1992 | Rossetti et al. ............. 422/194 |
| 5,837,208 | A | | 11/1998 | Grott et al. |

FOREIGN PATENT DOCUMENTS

EP 0 592 802 A1 4/1994

OTHER PUBLICATIONS

European Search Report for FR 0108788, dated Apr. 11, 2002.

* cited by examiner

*Primary Examiner*—Glenn Caldarola
*Assistant Examiner*—Jennifer A. Leung
(74) *Attorney, Agent, or Firm*—Millen, White, Zelano & Branigan, P.C.

(57) ABSTRACT

Contact, mixing, and often quenching box (8), with main dimension (D) and height (H7), comprising at least one duct section (B1) located on the upper part of said box (8) for entry of fluids in which said box (8) comprises, downstream from said duct section (B1), in the direction in which the fluids circulate, a means (B4) that provides, in said box (8), for making the fluids swirl in an approximately nonradial direction, and not parallel to the overall direction of circulation of said fluids, and comprising at least one annular, peripheral duct section (B6) for the exit of said mixture of fluids formed in said box (8) whose lower level is located above the upper level for fluid entry through at least one lateral inlet (B3) located in said box (8) above means (B4). A reaction cell (4), of an elongated shape along an approximately vertical axis comprising the contact, mixing, and quenching box (8) is useful for performing exothermic reactions.

22 Claims, 4 Drawing Sheets

CONTACT, MIXING, AND QUENCHING BOX FOR FLUIDS, COMPRISING AT LEAST ONE ANNULAR PERIPHERAL OUTLET AND REACTION CELL WITH AN ELONGATED SHAPE ALONG AN AXIS INCLUDING SAID BOX

FIELD OF THE INVENTION

In the specific field of reactions of hydrotreating, hydrodesulfurization, hydrodenitrification, hydrocracking, hydrodearomatization, and selective, total, or partial hydrogenation i.e., in the fields where the reactions are exothermic and require them to be cooled by a supplementary fluid, usually gaseous but optionally liquid or sometimes a mixture containing liquid and gas, it is necessary to have a very good quenching system to perform, on one hand, the cooling of the fluids from the process to the desired temperature and, on the other hand, the homogenization of their temperature (mixing function). It is also desirable that the means, or more than one means, providing for this function cause as small material losses as possible losses, even while having maximum efficiency. The fluid(s) of the process can be liquid or gaseous or mixed.

BACKGROUND OF THE INVENTION

To perform this quenching and/or this homogenization, one skilled in the art is often led to use a specific arrangement of internal parts that are often complex, comprising supplying the quenching fluid, as homogeneous as possible, into the reactor section. U.S. Pat. No. 6,180,068 describes in particular an arrangement of a mixing system for a gaseous phase and a liquid phase for a reactor working with descending current fluids and including, above a plate (15) for separating the reactor into two parts, separate means for supplying gas and liquid, each means equipped with means for making each fluid rotate with the help of a deflector and a central inlet of the fluid mixture into the part of the system located below separation plate (15). Such a system is complex because it requires the installation of numerous internal parts without providing for efficient mixing of the two phases, gas and liquid. The fluid mixture exits this system through an annular section below plate (15) directly, without formation of a retention of fluids and thus without improving the quality of the mixture produced in the upper part of this system above plate (15) and entering into the lower part of said system through a central opening. These choices imply a necessarily reduced duct cross section. Indeed, the duct cross section must be significantly smaller than that of the box if it is not desired to reduce too much the volume of the box needed for the mixture. The use of a small duct section implies a large material loss at the box outlet.

According to the teaching of U.S. Pat. No. 5,462,719 many internal parts are used such as blades, fins, baffles, or deflectors to make the gaseous and liquid fluids rotate. Contrary to the teaching of the more recent patent cited above, the system used does not comprise separately starting the gaseous fluid and the liquid fluid to rotate, but that of the mixture of the two. However, as in the more recent patent cited above, this startup of rotation is performed in a part located above a separation plate (20) and includes supplying the mixture formed in a part located below said separation plate (20) with a mixture outlet made by numerous holes distributed on the periphery of the lower part of this mixing system. The major drawbacks of this type of system, besides the quality of the mixture which is often more or less good, are the bulkiness (space taken up in the reactor), the complexity of design and use, and the material loss.

U.S. Pat. No. 5,837,208 describes a mixing system located below a separation plate (16) in which the gaseous and liquid fluids enter together into a mixing chamber (20) located below said separation plate (16) through a spiliway system (26-27) located on the plate and making them rotate. The fluid mixture formed in said mixing chamber exits through a central opening located at a level lower than that of its entry into said box. This opening comprises walls (8) that force a retention of the fluid in said box and promote mixing among the various phases. One of the major drawbacks of this type of system is, in particular, due to the significant risk of a direct exit of a non-negligible portion of the fluid mixture, which does not sufficiently rotate in said box and exits directly by the central opening. Moreover, this choice implies a necessarily reduced duct cross section. Indeed, the duct cross section must be significantly smaller than that of the box if it is desired not to reduce too much the volume of the box needed for the mixture. The use of a small duct section implies a large material loss at the box outlet.

According to the technique described in U.S. Pat. Nos. 5,403,560 and 5,543,346, the system proposed for performing a quenching and mixing function comprises an upper part in which the fluids are made to rotate with the help of a helicoid screw and exit in a lower part located approximately at the center of the system. This relatively complex unit also includes a series of fins whose function is to create significant turbulence in the fluids, which further complicates the device. This system implies a necessarily reduced duct cross section. Indeed, the duct cross section must be significantly smaller than that of the box if it is desired not to reduce too much the volume of the box needed for the mixture. The use of a small duct section implies a large material loss at the box outlet.

In many systems described in the prior art, the inlets and outlets are generally very numerous as can be seen, in particular, from descriptions and patents U.S. Pat. No. 5,462,719 and U.S. Pat. No. 5,567,396. It is then unlikely that a preexisting local heterogeneity at the inlet to the system could be reduced at the outlet of the system, which does not appear to provide for a sufficient mixing with all of the fluid(s) circulating in the system.

SUMMARY OF THE INVENTION

This invention has, in particular, the object of providing for an efficient exchange among the quenching and process fluid(s). Its object is also to reduce the main drawbacks of the various systems of the prior art, such as that known by the applicant and cited above in this description, in particular:

to eliminate all the effects of non-homogeneity in the temperature of the process fluid(s).
to minimize the material loss ($\Delta P$) caused by the contact, mixing, and quenching box of this invention.
to reduce the drawbacks tied to the complexity and bulkiness of the solutions proposed in the prior art.

This invention relates to a contact, mixing, and often quenching box for fluids comprising at least one annular peripheral outlet. It also relates to a reaction cell of elongated form along an axis comprising said box and its use for performing exothermic reactions. Usually, the box according to this invention provides for at least part of the quenching, the coming into contact, and the mixing of at least one quenching fluid, this fluid being able to be liquid or gaseous or a mixture containing liquid and gas, with at least one process fluid able to be liquid or gaseous or a mixture containing liquid and gas, a part of which is hydrogen. This box is usually used in a cell or reactor containing at least one bed of catalytic, granular solids, the phases of various fluids circulating in the cell or reactor being in an overall descending flow in said cell and traversing said bed of granular solids.

BRIEF DESCRIPTION OF THE DRAWINGS

The attached drawings are schematic diagrams and should not be considered limiting.

DETAILED DESCRIPTION OF DRAWINGS

One large embodiment of box (8) according to this invention is described below in connection with FIGS. 2 and 3 without this diagram being considered limiting. Thus, this invention relates to a contact and mixing box (8) for at least two fluids connected to an upper level (BS), with main dimension (D) and height (H7), comprising at least one duct section or opening (B1) located on the upper part of said box (8) for the entry of said fluids into said box (8), in which said box (8) comprises, downstream from said duct section (B10 and in the direction of the overall descending circulation of said fluids, a means (B4) that provide, in said box (8), for making the fluids swirl in an approximately nonradial direction, not parallel to the overall direction of circulation of said fluids, from the upstream zone to the downstream zone of said box (8) and comprising at least one annular, peripheral duct section (B6) for the exit of said mixture of fluids formed in said box (8), whose lower level is located above the upper level of fluid entry through at least one lateral inlet (B3) located in box (8) above means (B4). Said box (8) according to the invention is most often a so-called quenching box. In box (8), with the effect of means (B4), the fluids acquire a so-called rotational or swirling movement usually in a plane that is not parallel to a plane going in the overall direction of circulation of said fluids and often in a plane approximately perpendicular to the overall circulation direction of said fluids. The mixture of fluids exiting box (8) then usually circulates in a direction that is approximately parallel to the overall direction of circulation of said fluids from the top to the bottom.

Height (H7) of box (8) is not an essential factor for implementing this invention. But usually a box having minimum bulkiness is sought. By way of nonlimiting example, box (8) will have height (H7) of about 5 mm to about 5000 mm, often about 10 mm to about 1000 mm and most often about 50 mm to about 500 mm.

Figure 1:
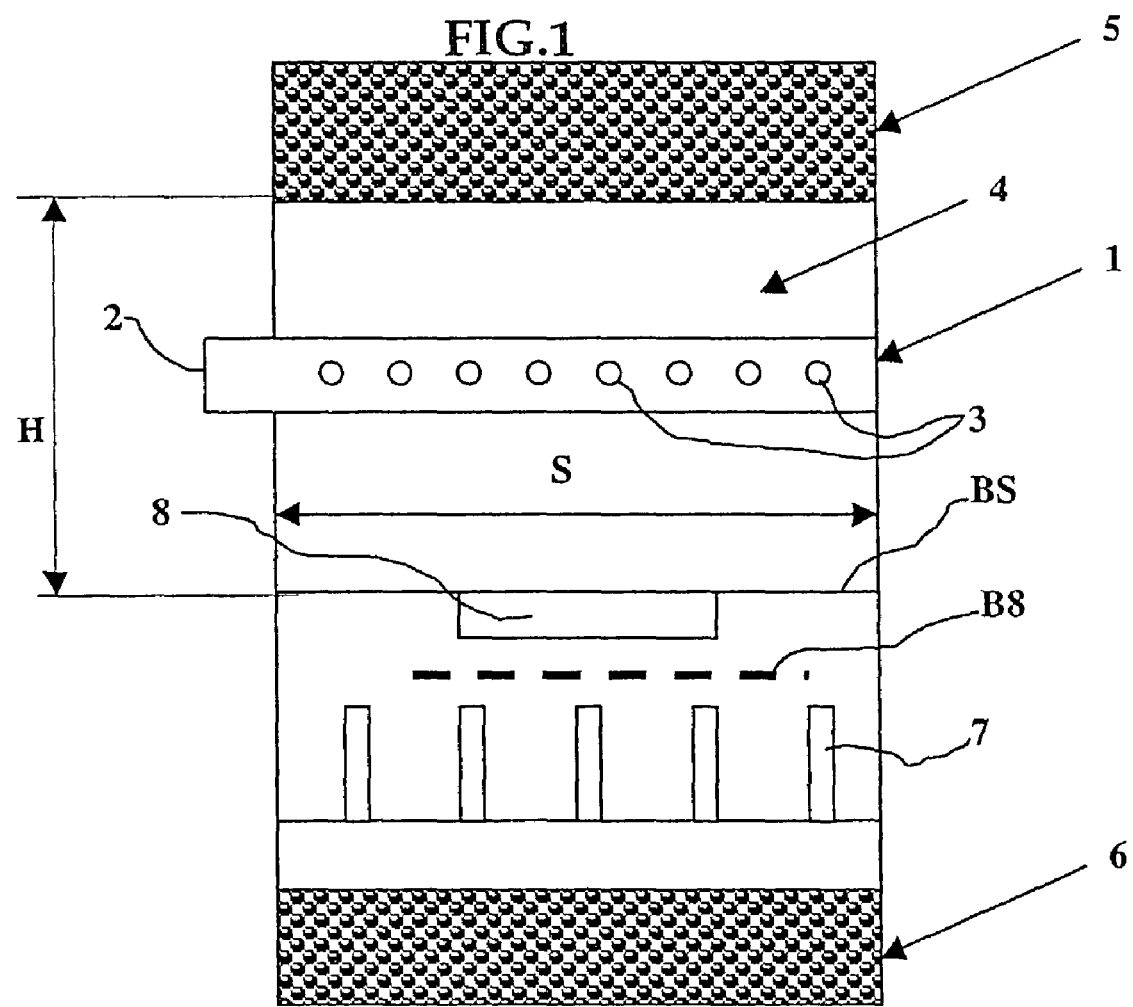
FIG. 1 represents a cutaway of a reaction cell comprising various elements detailed below, including a fluid contact, mixing and often quenching box (8).

This invention also relates to a reaction cell with an elongated shape along an axis comprising said box (8) such as, for example, the cell diagramed by way of nonlimiting example in FIG. 1. This reaction cell (4) with elongated shape along an approximately vertical axis in which at least one reaction fluid is made to circulate from the top to the bottom of said cell (4) through at least one catalyst bed (5), comprises, downstream from catalyst bed (5), in the circulation direction of said reaction fluid, at least one means (1) for supplying at least one quenching fluid and, downstream from said means (1) for supplying quenching fluid, at least one contact, mixing, and quenching box (8) for said fluids, such as diagramed in FIG. 3, with main dimension (D) and height (H7), comprising at least one duct section or opening (B11) located on the upper part of said box (8) for the entry of said fluids into said box (8), in which said box (8) comprises, downstream from said duct section (B11), in the direction of the overall descending circulation of said fluids, a means (B4) that provides, in said box (8), for making the fluids swirl in an approximately nonradial direction, not parallel to the overall circulation direction of said fluids from the upstream zone to the downstream zone of said box (8) and comprising at least one annular, peripheral duct section (B6) for the exit of said mixture of fluids formed in said box (8) whose lower level is located above the upper level of fluid entry through at least one lateral inlet (B3) located in box (8) above means (B4).

According to the invention, at least one gaseous reaction fluid containing hydrogen and at least one liquid reaction fluid are most often made to circulate in the reaction cell through at least one catalyst bed, and at least one quenching fluid is introduced downstream from said catalyst bed.

Box (8) or the reaction cell according to the invention are used in particular for performing exothermic reactions.

Box (8) or the reaction cell are used more particularly for performing at least one reaction selected from the group formed by reactions of hydrotreating, hydrodesulfurization, hydrodenitrification, hydrocracking, hydrodearomatization, and selective or total or partial hydrogenations.

This cell comprises at least one tube (1) (see FIG. 1) for supplying the quenching fluid, this tube having at least one duct section (2) (see FIG. 1) of any shape but preferably oblong or approximately circular for the entry of most of the quenching fluid and at least one duct section (3) (see FIG. 1) of any shape for the exit of most of the quenching fluid. The quenching fluid is injected into said cell (4) (see FIG. 1) approximately below a bed of granular solid (5) (see FIG. 1) and in the nonlimiting case of this invention diagramed in figure (1) approximately above a bed of granular solid (6) (see FIG. 1). FIG. 1 diagrammatically represents a cell or reactor according to the invention but should not be considered limiting and the same is true for FIGS. 2, 3 and 4, which are only detailed diagrammatic examples illustrating this invention. Similar parts are designated by the same reference numbers and letters on these diagrammatic figures. This cell as diagramed in FIG. 1 comprises a distribution plate (7) of various phases circulating in the cell. We would not transcend the scope of this invention by including, in cell (4), several distribution plates and/or several systems for supplying a quenching fluid. Box (8) of any shape being an integral part of this invention, it can occupy from 2 to 100% of cross section (S) of the cell, it often occupies from 5 to 98% of this cross section and most often from 10 to 50% of this cross section. This box (8), diagramed in FIG. 1 and in more detail in FIG. 3, comprises in its upper part at least one duct section (B1) (see FIG. 3) of any shape for supplying the process fluid(s) that can be either gaseous, liquid and gaseous, or liquid and for supplying the quenching fluid(s) that can be either gaseous, liquid, or liquid and gaseous into box (8) and at least one duct section (B6) (see FIG. 3) of any shape in its upper, lateral part for the discharge of the mixture of process and quenching fluids. Thus-defined duct sections (see FIG. 3) (B1) and (B6) are not one above the other. Means (B4) located downstream from each duct section (B1) (see FIG. 5) are most often a deflector (B4) of any shape whose envelope corresponds approximately to the envelope of duct section (B1) and whose length (L4) (see FIGS. 4 and 5) (ends included) is usually between about (L3) and about 100%, (optionally about 90% sometimes about 80% or about 50%) of length (L) (see FIGS. 4 and 5) of the inlet to duct section (B1). Length (L3) is itself usually about 1% to 100% of main dimension (L) and preferably between 30% and 80% of said length (L). Length L of section (B1) is itself usually about 1% to 100% of main dimension (D), this ratio depends on the number of duct sections (B1), in particular if there are three duct sections (B1) (see FIG. 2), L is often about 1% to 95%, preferably about 5% to 50% of main dimension (D). All of the fluids entering mixing and quenching box (8) by openings (B1) (said box (8) comprises at least one opening (B1) but often 2, 3 or 4 and, more optionally (this choice of number of openings being a compromise between loss and feed, reduced if the number increases, and mixture quality, degraded if the number increases), these openings being located on upper plate (BS) providing for the separation of the reactor into two parts so that all the fluids pass through openings (B1) (see FIGS. 2 and 3). The fluids reach the interior of box (8), usually of circular cross section with diameter D and preferably cylindrical, by passing usually through a duct that is most often cylindrical and with any base (B2) and of height (H2+H3) comprising at its end a lateral opening (B3) and a plate (B4) closing the lower part of the duct and acting as a deflector. The lateral opening makes it possible to give an azimuthal component to the speed of the fluids, thus giving the latter an overall rotational movement inside the box. Plate (B4) is preferably horizontal so as to promote the longest dwell time inside the box. It is often wise to leave an empty space of height (H4) between bottom (B5) of box (8) and plate (B4) so as not to impede the rotational movement of the fluids in the box. The bottom of box (B5) is preferably solid but can optionally comprise small holes such as, for example, so-called weepholes, making it possible to empty the box of all fluid when the unit stops. The fluids swirl in the box and exit it through lateral wall (B7) provided with at least one annular outlet (B6) of height (H6). The lower part of the box (B5 and B7) is held by an attachment system, such as, for example, one or several fastening hooks, connecting it to upper part (BS). This attachment system can be of any kind and is not represented in the figures. To promote mixing, it is important to prevent one part of the fluid throughput being able to exit too quickly from the box. For this, it is recommended to choose heights (H2), (H3), (H4), and (H6) so that there is a gradation (DH) between the top of section (B3) and the bottom of section (B6). The fluids coming from (B3) thus hit the solid part of (B7) and swirl in the box before exiting through section (B6).

Figure 5:
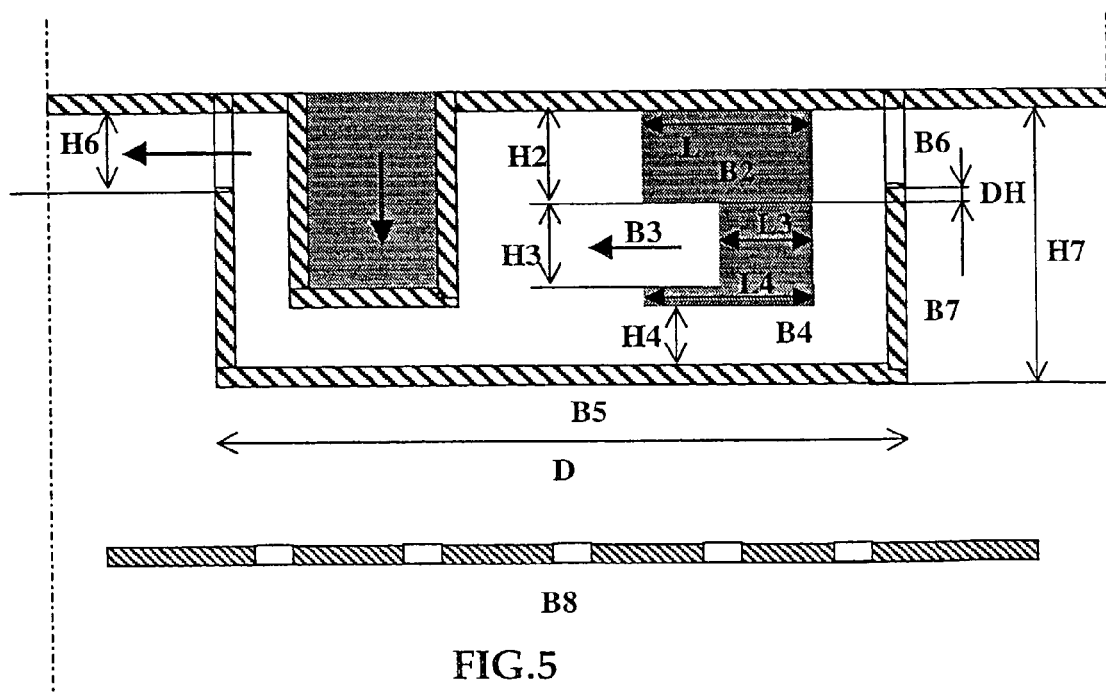
FIG. 5 shows the insertion of box (8) into the inside of the cell with a more detailed view of plate (B8)

Downstream from the mixing and quenching box, it is recommended to install, within the column (see FIG. 5), a plate (B8) of the type with holes so as to promote good distribution of fluids on the distribution plate, itself placed downstream from this plate. This plate is held in place by a means not represented in FIG. 5 at a nonzero distance from upper part B5 of box (8). This plate (B8) is in any case located between the box and the distribution plate if it exists or above bed (6) if the distribution plate does not exist and if there is a bed (6). It can be wise to make plate (B8) without uniform distribution of the holes. Thus it is avoided that the holes are placed in the part of the plate located vertically below section (B6) as represented in the diagram of FIG. 5. The fluids coming from the mixing and quenching box fall almost vertically on the part of plate (B8) that has no holes, the effect of this impact makes the fluids spread over the surface of this plate, finally to flow through the holes of the plate and on the periphery of said plate.

The box according to this invention can be used without quenching fluid solely to reestablish thermal homogeneity of fluids, as has already been mentioned above.

Height (H2) between upper plate (BS), to which box (8) is connected, and the height of lateral opening or inlet (B3) is usually about 2% to about 80% and often about 10 to about 50% of dimension or height (H7) of box (8). Height (H3) of lateral opening (B3) is usually about 2% to about 80% and often about 10 to about 50% of dimension (H7) of box (8). Height (H4) between means (B4) forming the deflector and the bottom of box (8) is usually (ends included) between 0 and 75%, often between 1 and 75% and very often between 5 and 50% of height (H7) of box (8). Although it is possible for the sum of heights H2+H3 to be equal to dimension H7 of box (8), preferably this sum is strictly less than H7 and thus height H4 is not zero. Height H6 of peripheral annular outlet B6 is usually about 1% to about 99% of dimension H7 of box (8) and often about 2% to about 95% of height H2 defined above, most often about 2% to about 90% of this height H2 and preferably about 10% to about 90% of this height H2.

Figure 3:
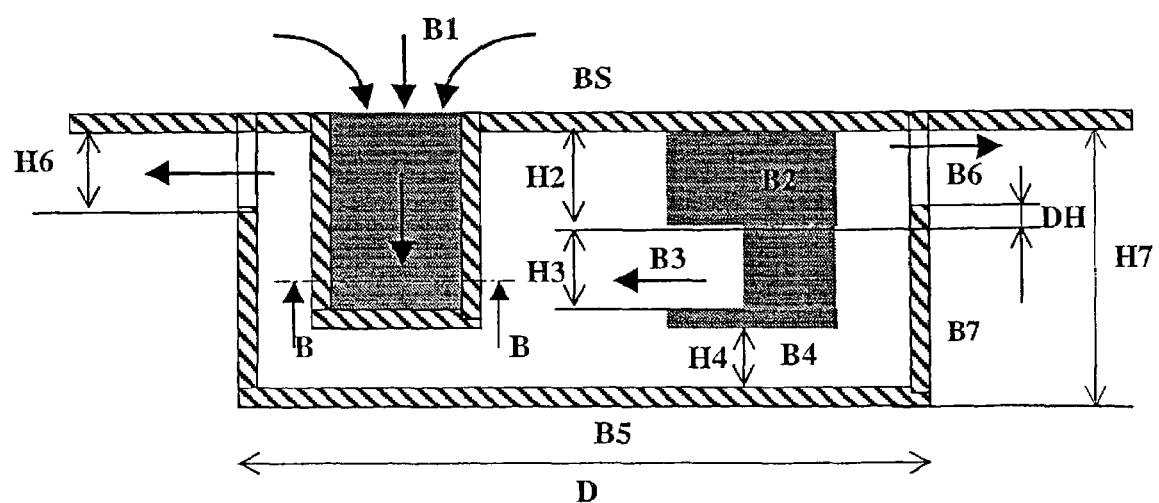
FIG. 3 is a more detailed diagrammatic view of box (8) in a cutaway view along a vertical plane passing through axis AA mentioned in FIG. 2.
Figure 4:
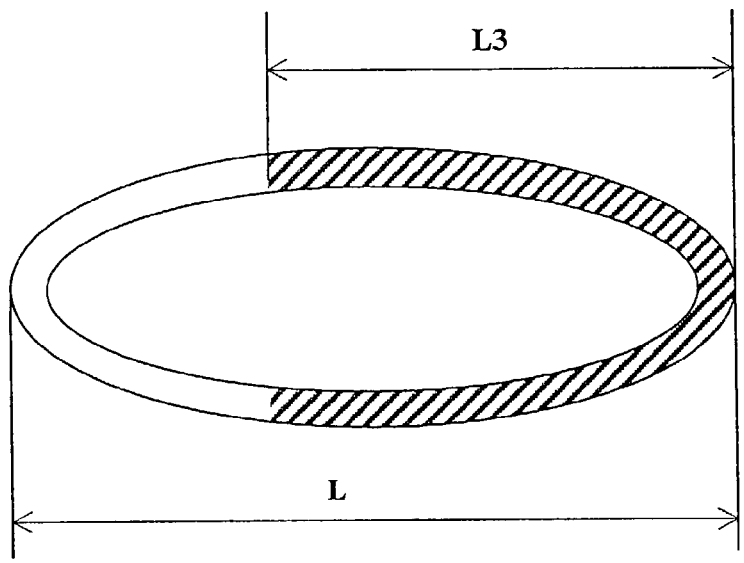
FIG. 4 is a diagrammatic view of the supply inlet for fluids into box (8), a cutaway view along a horizontal plane passing through axis BB mentioned in FIG. 3.

Duct section (B1) for entry of the fluid mixture of box (8) and duct (B2) of said fluid mixture are of length L as defined above (see FIGS. 3 and 4).

The reaction cell that is also part of this invention often comprises, downstream from box (8), in the direction of circulation of the reaction fluid(s), at least one distributor plate (7) as diagramed in FIG. 1 and, downstream from the latter, in the direction of circulation of the reaction fluid(s), at least a second catalyst bed (6).

According to another embodiment, the reaction cell can comprise, downstream from box (8), in the direction of circulation of the reaction fluid(s), at least one diffuser of the perforated plate type (B8)(see FIGS. 1 and 5) and, downstream from the latter, in the direction of circulation of the fluid(s), at least one distributor plate (7) (see FIG. 1) and, downstream from this latter, in the direction of circulation of the fluid(s), at least a second catalyst bed (6).

Cell (4) is most often a cell with a circular cross section that comprises a box (8) whose surface area is less than the surface area of the cell's cross section and in any case the total surface area of duct sections (B1) is less than the surface area of the cell's cross section and likewise the total surface area of duct sections (B6) is less than the total surface area of the peripheral surface area of box (8).

Figure 2:
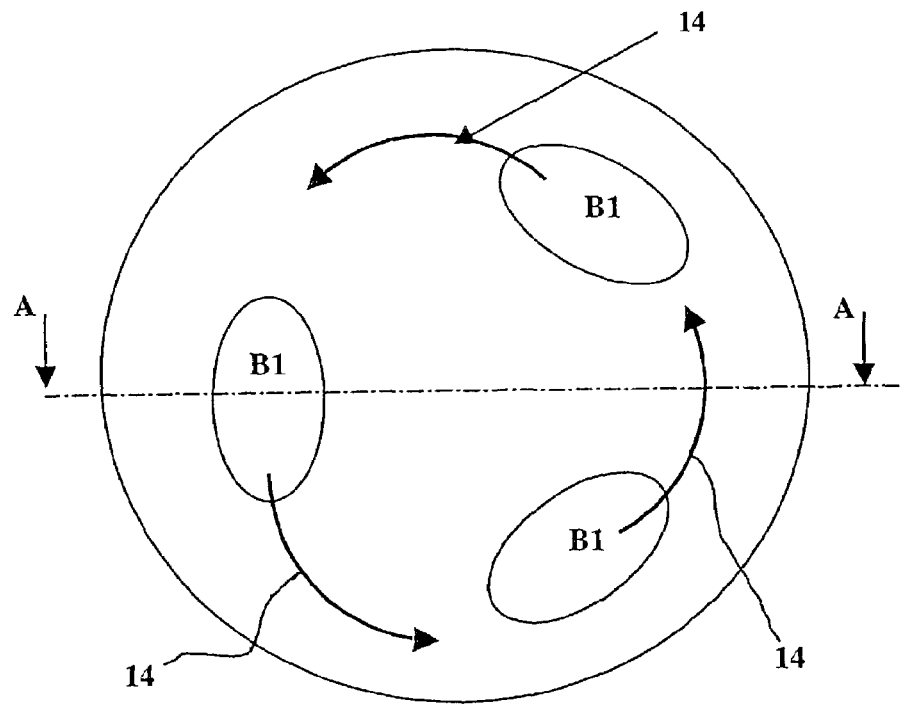
FIG. 2 is a top view of a box (8) according to the invention, comprising three fluid inlets (B1).

With respect to the devices described in the prior art, the device that comprises box (8) of this invention offers the following advantages:
  an increased mixing efficiency from the succession of the following elementary operations: flow of all the fluids in a limited number of duct sections, spillway effect at the box inlet, impact on internal part (B4) creating the spillway inside the mixing box combined with a swirling effect caused by the change of direction (vertical movement tending toward horizontal movement) [this horizontal movement is diagramed in FIG. 2 by the line and arrows (14)]. Further, box (8) causes a swirling effect by impact of the fluid mixture on wall (B7) of the box and a supplementary spillway effect at the outlet of box (8) through section (B6), these different steps contributing to a significant increase in the contact surface and the dwell time of the mixture of fluids in said box (8).

an easier redistribution of fluids on the distributor plate located downstream from the box, simple implementation, a compact unit, a small loss of material due to the small number of internal parts used and their particular arrangement.

Other advantages and characteristics of the invention will appear better upon reading the description provided below by way of example.

Figure 6:
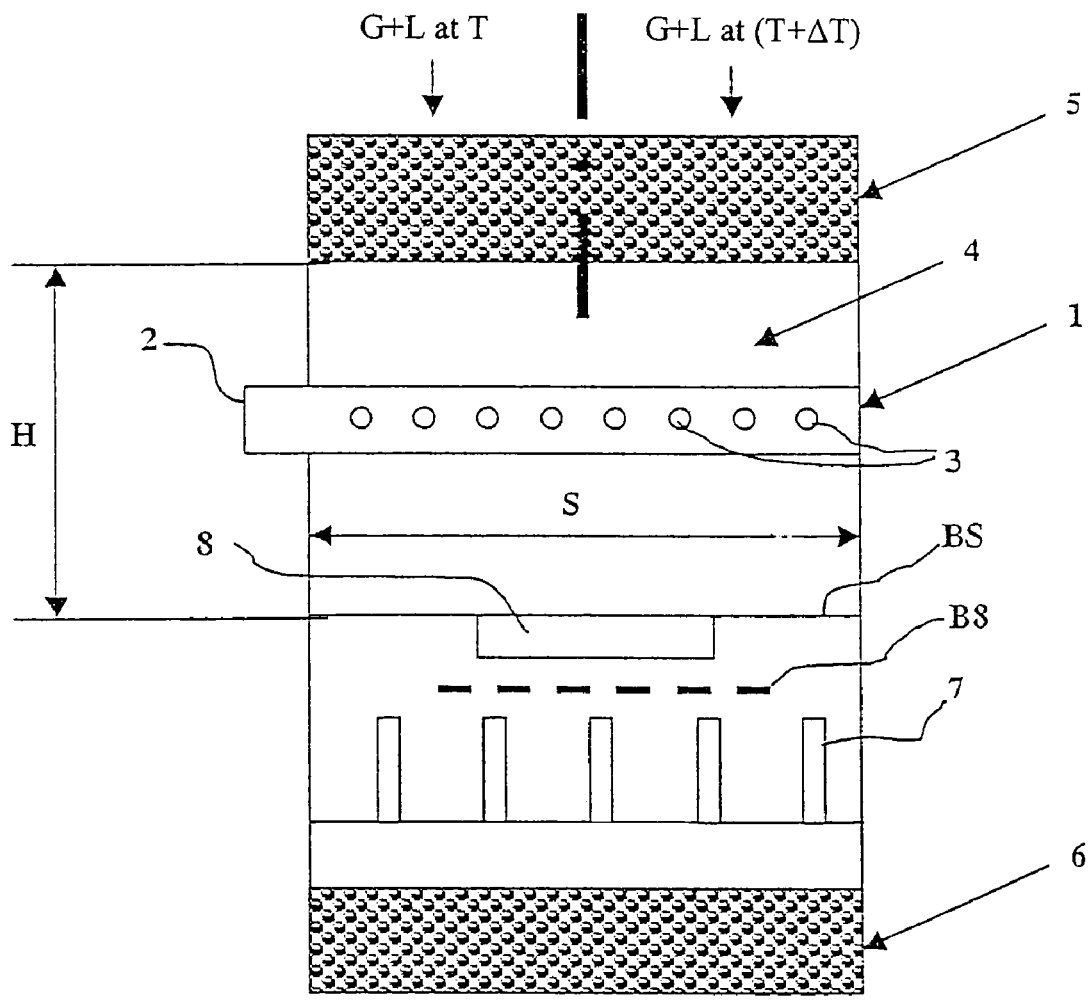
FIG. 6 is a model used for experimentation.

FIG. 1 shows diagrammatically a reactor comprising two beds (5) and (6) of granular solids between which are located a quenching tube (1), provided with an inlet section (2) and duct sections (3) for at least one quenching fluid, a box (8), a perforated plate-type diffuser (B8) and a distributor plate (7). Box (8) is located at a distance (H) below catalytic bed (5) (see FIGS. 1 and 6). This distance (H) is usually about 50 mm to about 3000 mm, often about 100 mm to about 1500 mm. One would not transcend the scope of this invention by using a cell comprising no diffuser (in particular a perforated plate-type diffuser).

By way of nonlimiting example, efficiency measurements of a device such as the one diagramed in more detail in FIGS. 2 and 3 were performed according to the principle described below. A model with a diameter of 480 mm is cut into two sectors in its upper part (see FIG. 6). The two sectors are supplied the same way with gas and liquid (G+L), one sector being heated (fluids at temperature T+ΔT, the other not heated (fluids at temperature T). Thermal disequilibrium ΔT is fixed at 35° C. Downstream from this part representing catalytic bed (5), the unit comprises a mixing chamber of height (H), in whose interior is placed an injection tube (1) for the quenching gas (so-called quenching tube), followed by a box (8) for contact, mixing, and quenching. Temperature measurements are performed at the outlet of the bed of granular solids (5) and at the outlet of box (8). The measurements were performed for a liquid surface speed in a vacuum shaft (Vsl) of 1 cm/s and for a gas surface speed in a vacuum shaft (Vsg) of 10 cm/s and for a surface speed in a vacuum shaft for the supplying the quenching gas (Vsgq) of 0.5 cm/s. Cases 1, 2 and 3 (table 1) were performed with a chamber height (H) varying from 1000 mm to 250 mm, and with a standard box (8), i.e., not comprising any means for making the fluids rotate inside the box and having the fluid inlets in the upper part and the fluid outlet in its lower part. Case 4 corresponds to a mixing box having a system for making the fluids rotate and a central outlet of the type described in U.S. Pat. No. 5,837,208. Case 5 was performed under exactly the same conditions as case 4 but with the use of a box (8) comprising a peripheral outlet for the fluid mixture. All these cases were performed with a box (8) with identical external geometry (constant diameter and height of the box, respectively, equal to 210 mm and 65 mm).

TABLE 1

| Case | H (mm) | Rotation Effect | Outlet Type | Efficiency | ΔP/ΔP Standard Between Box Inlet And Outlet |
|---|---|---|---|---|---|
| 1 | 1000 | No | Standard | 78% | 1 |
| 2 | 500 | No | Standard | 58% | 1 |
| 3 | 250 | No | Standard | 45% | 1 |
| 4 | 250 | Yes | Central | 85% | 1.4 |
| 5 | 250 | Yes | Peripheral | 85% | 0.8 |

It is determined that:

1: The reduction in the height of the chamber is detrimental to the efficiency of the quenching unit, the efficiency of the mixing determined from temperature deviations at the outlet of the contact, mixing, and quenching box diminishes when height H is reduced (comparison of cases 1, 2, and 3).

2: The use of internal parts making it possible to make the fluids rotate inside the box makes it possible to achieve very high mixing efficiencies, and the same is true for a very reduced chamber height (cases 4 and 5 compared with case 3).

3: The efficiency gain obtained with a central outlet is accompanied by an increase in material loss of 40%, which is considerable.

4: The use of the box which is the object of this invention makes it possible to achieve a very good efficiency higher than or equal to other systems while making it possible to achieve a significant reduction in bulk and simultaneously a significant reduction in the material loss caused by the box. Thus it is determined that, with a mixing efficiency as good as that obtained with the system described in U.S. Pat. 5,837,208, the material loss caused by the use of this system is greater than with the use of box (8) according to this invention.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French Application No. 01/08.788, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A contact and mixing box (8) for mixing at least two fluids, comprising a bottom (B5) and an upper part connected to an upper plate (BS), said contact and mixing box (8) having a largest horizontal dimension (D) and a height (H7), and comprising at least one downward duct section or opening (B1) located on the upper part of said contact and mixing box (8), and downstream from said downward duct section or opening (B1), in a direction of overall descending circulation of said fluids, a means (B4) in said contact and mixing box (8) for making the fluids swirl in an approximately nonradial direction, not parallel to the direction of overall descending circulation of said fluids from a zone upstream of said box (8) to a zone downstream of said box (8), and wherein said contact and mixing box (8) comprises at least one lateral inlet (B3), said lateral inlet (B3) having an approximately vertical cross sectional opening, said approximately vertical cross sectional opening having a top section and a bottom section, at least part of said bottom section being located above said means (B4), and at least one peripheral annular duct section (B6) having an upper level and a lower level, said lower level being located at least in part above the top section of said approximately vertical cross sectional opening of said at least one lateral inlet (B3) and being spaced from said duct section or opening (B1) for the exit of a mixture of fluids formed in said contact and mixing box (8).

2. A contact and mixing box according to claim 1 wherein height (H7) of said contact and mixing box (8) is about 5 mm to about 5000 mm.

3. A contact and mixing box according to claim 1, wherein said duct section or opening (B1) has a length L at between 1% and 100% of said largest horizontal dimension (D) of said box (8).

4. A contact and mixing box according to claim 1, wherein means (B4) located downstream from each duct section or opening (B1) comprises a deflector of any shape having a length (L4) between about that of (L3) and about 100% of length (L) of said duct section or opening (B1), wherein said length (L3) is about 1% to 100% of the length (L) of said duct section or opening (B1), said deflector and said duct section or opening (B1) having an approximately similar projection on a horizontal plane.

5. A contact and mixing box (8) according to claim 1, wherein means (B4) is an approximately horizontal plate.

6. A contact and mixing box (8) according to claim 1, wherein said bottom (B5) of said box (8) is vertically spaced away from said means (B4), thereby defining an empty space of height (H4) between said bottom (B5) and said means (B4).

7. A contact and mixing box (8) according to claim 6, wherein height (H4), is between 1% and 75% of height (H7) of said box (8).

8. A contact and mixing box (8) according to claim 1, wherein height (H2) between upper plate (BS), to which box (8) is connected, and the top of the vertical cross section lateral opening (B3) is about 2% to about 80% of height (H7) of said box (8).

9. A contact and mixing box (8) according to claim 8, wherein said vertical cross section of lateral inlet (B3) has a height (H3) about 2% to about 80% of height (H7) of said box (8).

10. A contact and mixing box (8) according to claim 9, wherein the sum of heights (H2+H3) is less than height (H7) of said box (8).

11. A contact and mixing box (8) according to claim 1, wherein height (H6) of peripheral annular duct section (B6) is about 1% to about 99% of height (H7) of said box (8).

12. A reaction cell (4) of elongated shape along an approximately vertical axis comprising means to circulate at least one reaction fluid from the top to the bottom of said cell (4) through at least one catalyst bed (5), said reaction cell (4) comprising, downstream from catalyst bed (5), in the direction of circulation of said reaction fluid, at least one means (1) for supplying at least one quenching fluid and downstream from said means (1) for supplying the quenching fluid, at least one contact and mixing box (8) according to claim 1.

13. A reaction cell according to claim 12, wherein said cell has a horizontal cross section (S) and wherein box (8) occupies 2 to 100% of said cross section (S) of the cell.

14. A reaction cell according to claim 12 further comprising downstream from box (8), in the circulation direction of the reaction fluid, at least one distributor plate (7) and, downstream from the latter, in the circulation direction of the reaction fluid, at least a second catalyst bed (6).

15. A reaction cell according to claim 12, further comprising downstream from box (8), in the circulation direction of the reaction fluid(s), at least one perforated plate diffuser (B8) and downstream from the latter, in the circulation direction of the reaction fluid(s), at least one distributor plate (7), and downstream from the latter in the circulation direction of the reaction fluid(s), at least a second catalyst bed (6).

16. In a process for performing an exothermic reaction in a reaction cell, the improvement comprising the steps of:
    providing the reaction cell in accordance with claim 12; and
    passing quenching fluid and reaction fluid into said contact and mixing box (8).

17. In a process for performing, at least one reaction of hydrotreating, hydrodesulfurization, hydrodenitrification, hydrocracking, hydrodearomatization, or selective or total or partial hydrogenations in a reaction cell, the improvement comprising the steps of:
    providing the reaction cell in accordance with claim 12; and
    passing quenching fluid and reaction fluid into said contact and mixing box (8).

18. The contact and mixing box (8) according to claim 1., wherein all of said bottom section of lateral inlet (B3) is located above said means (B4).

19. The contact and mixing box (8) of claim 1, wherein all of lower level of said annular duct section (B6) is located above the top of section of said approximately vertical cross section of the lateral inlet (B3).

20. The contact and mixing box (8) according to claim 18, wherein all of lower level of said annular duct section (B6) is located above the top of section of said approximately vertical cross section of the lateral inlet (B3).

21. The contact and mixing box (8) according to claim 1, wherein said bottom (B5) is solid.

22. The contact and mixing box (8) according to claim 1, wherein said bottom (B5) is substantially solid.

* * * * *

UNITED STATES PATENT AND TRADEMARK OFFICE
CERTIFICATE OF CORRECTION

PATENT NO. : 7,314,602 B2 Page 1 of 1
APPLICATION NO. : 10/187432
DATED : January 1, 2008
INVENTOR(S) : Ludovic Raynal It is certified that error appears in the above-identified patent and that said Letters Patent is hereby corrected as shown below:

On the title page, item [75] Inventors: line 2, reads "Lyons" should read -- Lyon --
Column 10, line 30, reads "performing, at least" should read -- performing at least --

Signed and Sealed this

First Day of July, 2008

JON W. DUDAS
*Director of the United States Patent and Trademark Office*